2,927,861

FOOD COMPOSITIONS

Harry John Charie and Jack Palmer Savage, Bedford, England, assignors to Thomas J. Lipton, Inc., Hoboken, N.J., a corporation of Delaware No Drawing. Application March 4, 1957
Serial No. 643,548

Claims priority, application Great Britain March 8, 1956

5 Claims. (Cl. 99—139)

This invention relates to food compositions, and, in particular, to starch-containing dry compositions, particularly powers, which may be mixed with milk at room temperature to form puddings.

Powders containing pre-gelatinised starch and a tetraalkali metal pyrophosphate, such as tetrasodium or tetrapotassium pyrophosphate, together with whatever sweetening or flavouring agents are desired, normally give puddings of satisfactory firmness when mixed with milk at room temperature and allowed to set. It has been found, however, that some milk gives puddings of very unsatisfactory, that is thin or even sloppy, texture and that firmer puddings can be obtained with such milk by incorporating an alkaline reacting substance in the pudding. One factor which tends to give rise to this unsatisfactory property in milk is prolonged storage but other factors, such as the feed given to the cow, may also affect the milk.

According to the invention there is provided a dry composition capable of forming a pudding when mixed with milk at room temperature which composition contains pre-gelatinised starch, a tetraalkali metal pyrophosphate and a water-soluble alkaline reacting substance as hereinfter described.

Preferably, the dry composition is in powder form.

The water-soluble alkaline reacting substance and the amount used are generally chosen such that the pH of the pudding is at least 7.3. Beyond a pH of 8.3 the thickening effect of the alkaline reacting substance is likely to decrease or even to be reversed. Moreover, the flavour of the resultant pudding is likely to deteriorate unduly beyond that pH. The preferred pH range is 7.5 to 8.

The pH of fresh milk is about 6.6. The nature and the amount of the alkaline reacting substance used are normally chosen so as to give the required pH with such milk when the composition and the milk are mixed in the usual proportions. It may be necessary to make adjustments if it is anticipated that milk of different pH is to be used in the preparation of the pudding.

Suitable water-soluble alkaline reacting substances include alkali metal carbonates and bicarbonates, such as sodium or potassium bicarbonate or carbonate. Other alkaline reacting substances such as alkaline salts of organic acids, for instance sodium tartrate, may also be used. The alkaline reacting substance should, however, be free from any toxic effects and should not possess or give rise to any undesirable flavours. Calcium sequestering agents, for instance metaphosphates and citrates, or magnesium compounds, which inhibit gelling, should not be used. Alkaline reacting orthophosphates, such as the tri-alkali orthophosphates, are also excluded from this invention. These orthophosphates include the tri-orthophosphates of the alkali metals sodium and potassium.

Dry compositions according to the invention preferably contain a substance capable of acting as a dispersing agent to prevent undue agglomeration when the composition is added to the milk. The preferred agent is a sugar.

The compositions may be prepared simply by mixing the powdered ingredients in the required proportions.

The proportion in the composition of pre-gelatinised starch (also known as "pudding starch") preferably lies in the range of 25 to 60 parts by weight; that of tetraalkali pyrophosphate in the range of 3 to 6 parts by weight (calculated as anhydrous tetrasodium pyrophosphate); that of sugar, the preferred sweetening agent which also acts as dispersing agent, in the range of 100 to 180 parts by weight and that of alkaline reacting substance in the range of 0.5 to 2 parts by weight (calculated as anhydrous sodium carbonate).

It has been found that care has to be exercised in the choice of the pyrophosphate; some batches are unsatisfactory in that they lead to insufficiently firm puddings or to puddings having a lumpy texture or in that the setting time of the pudding mixture is far in excess of the preferred setting time of 10 to 15 minutes from the addition of milk. It is thought that the method of preparation of the pyrophosphate is of importance in these respects in that high temperature treatment is likely to yield pyrophosphates which give poor results. A good guide to the suitability of any particular sample of pyrophosphate consists in dusting 0.25 gram of the pyrophosphate on to 100 mls. of milk, stirring moderately for 1 minute and then allowing the mixture to stand for an hour. By that time the mixture should have set to a gel which, when cut with a spoon, gives a clean cut. This test is not conclusive in that certain samples of pyrophosphate which do not pass this test give satisfactory puddings but all the samples of pyrophosphate which passed the test were found to be suitable for use in puddings.

If desired, sufficient milk powder may be incorporated in the dry composition so that the composition may be mixed with water instead of milk. Smaller amounts of milk powder may be incorporated to improve the flavour of the pudding. Small amounts of edible water-soluble calcium salts such as calcium acetate may be incorporated to improve the texture of the pudding. The compositions will contain one or more sweetening and flavouring agents.

To prepare a pudding the composition is mixed with milk or, where it is permissible, water, mixing with a fork or spoon being sufficient although a mechanical mixer is, of course, more convenient, and the mixture is then allowed to set.

If desired, the alkaline reacting substance may be incorporated in the starch during the pre-gelatinisation treatment or it may be mixed with the other ingredients at the time the pudding is prepared and may then be added as such or with the milk or water.

The following examples illustrate the invention.

Example 1

A powder was prepared by mixing the following ingredients in a small mechanical mixer.

| | Grams |
|---|---|
| Pre-gelatinised pudding starch | 45 |
| Cane sugar | 150 |
| Anhydrous tetrasodium pyrophosphate | 4.5 |
| Artificial vanilla flavour | 0.25 |
| Edible yellow dye | 0.01 |

The powder was sprinkled on the surface of 1 litre of fresh milk (pH 6.5) at room temperature and the mixture was hand-whisked for 1 minute. The mixture had not set satisfactorily and could not be cut cleanly with a spoon 10 minutes after whisking was discontinued. The pH of the mixture was 7.0.

An exactly similar powder, except that it also contained 1.0 grams anhydrous sodium carbonate, was mixed with another litre of the same milk in the same way. The resultant pudding, having a pH of 7.6, gave a clean cut when cut with a spoon 10 minutes after whisking was discontinued.

Equally satisfactory results were obtained when another powder, in which 1.1 grams anhydrous potassium carbonate were used instead of 1.0 gram anhydrous sodium carbonate, was mixed with a litre of the same milk.

*Example 2*

A powder was prepared in the same way as in Example 1 containing

| | Grams |
|---|---|
| Pre-gelatinised pudding starch | 50 |
| Cane sugar | 150 |
| Anhydrous tetrasodium pyrophosphate | 4.5 |
| Anhydrous sodium carbonate | 1.25 |
| Cocoa powder | 30 |

A satisfactory pudding, having a pH of 7.7, was prepared by mixing the powder with 1 litre of the milk used in Example 1.

We claim:

1. A dry composition capable of forming a pudding when mixed with milk at room temperature, said composition containing pre-gelatinized starch, a tetra-alkali metal pyrophosphate and an alkali metal salt of carbonic acid in amount which will impart slight alkalinity to the pudding formed.

2. A dry composition according to claim 1 which also contains a substantial amount of sugar.

3. A dry composition according to claim 1 which also contains milk powder.

4. A dry composition capable of forming a pudding when mixed with milk at room temperature, said composition containing, by weight, 25 to 60 parts of pre-gelatinized starch, 3 to 6 parts of tetra-alkali metal pyrophosphate, 100 to 180 parts of sugar, and 0.5 to 2 parts of sodium carbonate.

5. A dry composition according to claim 4 which also contains milk powder.

References Cited in the file of this patent
UNITED STATES PATENTS

| 2,500,179 | Hinz et al. | Mar. 14, 1950 |
| 2,607,692 | Kennedy | Aug. 19, 1952 |
| 2,784,099 | Block et al. | Mar. 5, 1957 |
| 2,801,924 | Clausi | Aug. 6, 1957 |